United States Patent
McGill et al.

(10) Patent No.: US 11,663,860 B2
(45) Date of Patent: May 30, 2023

(54) DYNAMIC AND VARIABLE LEARNING BY DETERMINING AND USING MOST-TRUSTWORTHY INPUTS

(71) Applicant: TOYOTA RESEARCH INSTITUTE, INC., Los Altos, CA (US)

(72) Inventors: Stephen G. McGill, Cambridge, MA (US); Guy Rosman, Newton, MA (US); Luke S. Fletcher, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 682 days.

(21) Appl. No.: 16/663,841

(22) Filed: Oct. 25, 2019

(65) Prior Publication Data

US 2021/0125431 A1   Apr. 29, 2021

(51) Int. Cl.
*G06N 20/00* (2019.01)
*G07C 5/08* (2006.01)

(52) U.S. Cl.
CPC ........... *G07C 5/0808* (2013.01); *G06N 20/00* (2019.01)

(58) Field of Classification Search
CPC .... G07C 5/0808; G06N 20/00; G01S 13/865; G01S 13/867; G01S 13/931; G01S 17/931
See application file for complete search history.

(56) References Cited

U.S. PATENT DOCUMENTS

| 9,889,858 | B2 | 2/2018 | Schmüdderich |
| 2017/0016740 | A1 | 1/2017 | Cui et al. |
| 2017/0278014 | A1* | 9/2017 | Lessmann ............... G06T 7/269 |
| 2018/0232947 | A1* | 8/2018 | Nehmadi ................ G01S 7/295 |
| 2020/0019160 | A1* | 1/2020 | McArthur ............. G01S 7/4813 |
| 2021/0089039 | A1* | 3/2021 | Schultz ................ G05D 1/0221 |
| 2021/0124344 | A1* | 4/2021 | Hu ....................... G05D 1/0088 |

FOREIGN PATENT DOCUMENTS

DE   102016212326 A1 *   1/2018 ............ B60W 40/10

OTHER PUBLICATIONS

Ross Hans-Leo, Jan. 11, 2018, English Machine Translation_DE102016212326A1 provided by Patent Translate by EPO and Google (Year: 2018).*
Rosenstatter, Thomas, "Modelling the Level of Trust in a Cooperative Automated Vehicle Control System", Sep. 18, 2016, Halmstad University.
Dreossi, Tommaso, et al., "Semantic Adversarial Deep Learning", arXiv:1804.07045v2, May 18, 2018.

* cited by examiner

*Primary Examiner* — Peter D Nolan
*Assistant Examiner* — Ashley L Redhead, Jr.
(74) *Attorney, Agent, or Firm* — Seyfarth Shaw LLP

(57) ABSTRACT

A method of providing dynamic and variable learning for an ego vehicle by determining and using most-trustworthy inputs includes determining, based on ambient conditions of an environment of the ego vehicle, a level of trustworthiness of sensor values obtained from one or more ego vehicle sensors. The method also includes determining a level of confidence in an accuracy of an output of a subsystem of the ego vehicle. The output of the subsystem is based on the sensor values. The level of confidence is based on the level of trustworthiness of the sensor values.

16 Claims, 6 Drawing Sheets

DYNAMIC AND VARIABLE LEARNING BY DETERMINING AND USING MOST-TRUSTWORTHY INPUTS

BACKGROUND

Field

Certain aspects of the present disclosure generally relate to vehicle notifications and, more particularly, to a system and method for dynamic and variable learning by determining and using most-trustworthy inputs.

Background

A system/subsystem predictor (e.g., a trajectory predictor) may rely on inputs (e.g., sensor inputs) from devices (e.g., sensors and/or cameras) that the predictor should not be relying on, or may not rely on inputs from some devices that it should be relying on. For example, in a well-publicized vehicle crash, the trajectory predictor (or perhaps another subsystem) was relying on sensor input from a camera, but ignoring sensor input from LIDAR, even though under the circumstances, the LIDAR should have provided the most-trustworthy input. This detrimental reliance or lack thereof degrades the reliability of warning systems.

SUMMARY

A method of providing dynamic and variable learning for an ego vehicle by determining and using most-trustworthy inputs is described. The method includes determining, based on ambient conditions of an environment of the ego vehicle, a level of trustworthiness of sensor values obtained from one or more ego vehicle sensors. The method also includes determining a level of confidence in an accuracy of an output of a subsystem of the ego vehicle. The output of the subsystem is based on the sensor values. The level of confidence is based on the level of trustworthiness of the sensor values.

A system to provide dynamic and variable learning for an ego vehicle by determining and using most-trustworthy inputs is described. The system having a memory and one or more processors coupled to the memory. The processor(s) is configured to determine, based on ambient conditions of an environment of the ego vehicle, a level of trustworthiness of sensor values obtained from one or more ego vehicle sensors. The processor(s) is also configured to determine a level of confidence in an accuracy of an output of a subsystem of the ego vehicle. The output of the subsystem is based on the sensor values. The level of confidence is based on the level of trustworthiness of the sensor values.

A non-transitory computer-readable medium with non-transitory program code recorded thereon is described. The program code to provide dynamic and variable learning for an ego vehicle by determining and using most-trustworthy inputs. The program code is executed by a processor and includes program code to determine, based on ambient conditions of an environment of the ego vehicle, a level of trustworthiness of sensor values obtained from one or more ego vehicle sensors. The program code also includes program code to determine a level of confidence in an accuracy of an output of a subsystem of the ego vehicle. The output of the subsystem is based on the sensor values. The level of confidence is based on the level of trustworthiness of the sensor values.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
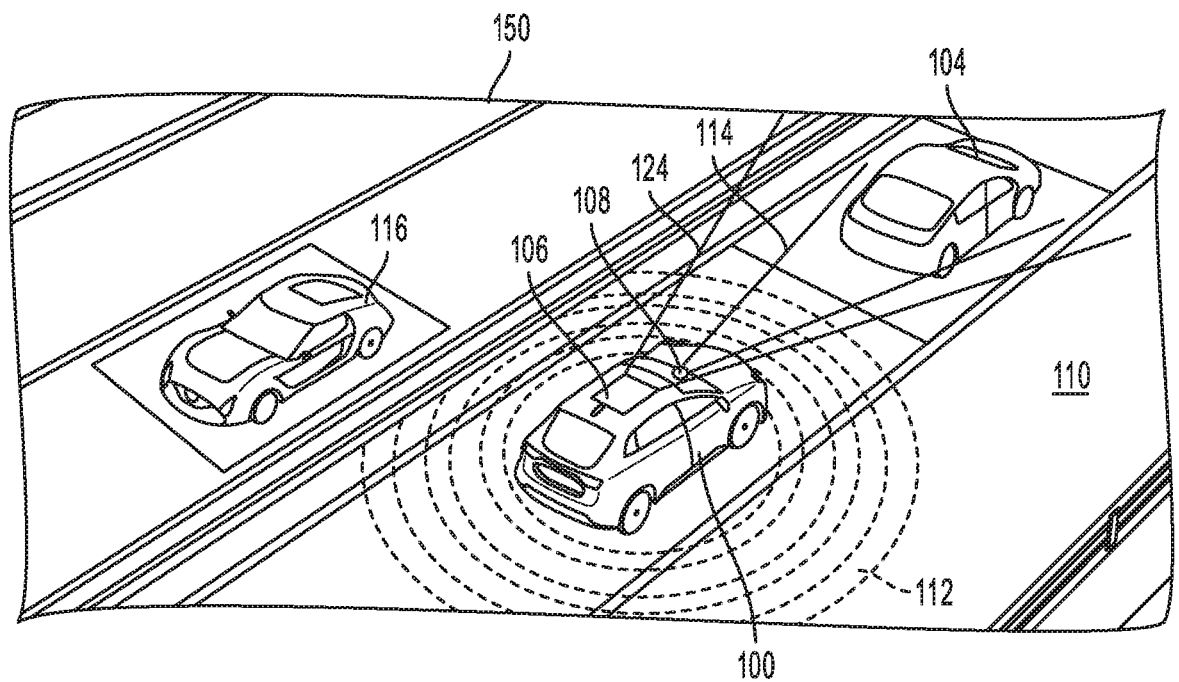
FIG. 1A illustrates an example of a vehicle in an environment according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

In recent years, various attempts have been made to realize an automatic operation of a movable body such as a four-wheel vehicle. For realization of an automatic operation of a movable body, it is important to correctly detect objects such as vehicles, pedestrians, and obstacles present around the movable body and to avoid danger while running based on the detection results. Of these two factors, an object detection technology using various sensors and radars is known as a technology to precisely detect surrounding objects.

A system/subsystem predictor (e.g., a trajectory predictor) may rely on inputs (e.g., sensor inputs) from devices (e.g., sensor system including sensors and/or cameras) that the predictor should not be relying on, or may not rely on inputs from some devices that it should be relying on. For example, in a well-publicized vehicle crash, the trajectory predictor (or perhaps another subsystem) was relying on sensor input from a camera, but ignoring sensor input from LIDAR, even though under the circumstances, the LIDAR should have provided the most-trustworthy input. This detrimental reliance or lack thereof degrades the reliability of warning systems.

Aspects of the present disclosure are directed to an ego vehicle configured to determine, based on ambient conditions determined by the ego vehicle, a trustworthiness of sensor values obtained from one or more sensors, cameras, or other devices. For a subsystem output generated based on the obtained sensor values, the ego vehicle may determine a confidence in the accuracy of the output generated by the subsystem, with the confidence being based (at least in part) on the trustworthiness of the obtained sensor values. The confidence in the accuracy of the subsystem output may be separate from a confidence in the fidelity of a model (e.g., separate from a confidence in the accuracy of a given prediction generated by a trajectory predictor).

As the ambient conditions change, the ego vehicle may update the trustworthiness of the sensor values, and may thus update the confidence in the output accuracy of a given subsystem.

In one aspect, the ego vehicle obtains sensor values from one or more sensors. For example, the ego vehicle may be equipped with a variety of sensors, and the ego vehicle may obtain the sensor values from one or more of these sensors. The sensor may include, for example, LIDAR, RADAR, a camera, a photoelectric sensor, or a microphone, among many other possibilities.

The ego vehicle determines one or more ambient conditions. For example, the ego vehicle may determine whether the ego vehicle is on a highway, in a crowded area, in a tunnel, at an intersection, or making a lane change. The ego vehicle may determine the amount of cloud cover, a current time of day, whether it's daytime or nighttime. The ego vehicle could determine any combination of these or other ambient conditions.

A sensor system of the vehicle may also include ambient condition sensors, providing sensor signals or ambient condition data correlated with ambient conditions such as external temperature, precipitation (such as rain or snow), road condition (e.g. roughness or the presence of water or ice), and the like.

The ego vehicle determines a trustworthiness of the obtained sensor values based on the determined ambient conditions. For example, if the ego vehicle is in a crowded or dense area, sensor values obtained from RADAR may be relatively untrustworthy—e.g., because the RADAR may be occluded and/or the sensor values may include an intolerable amount of noise. On the other hand, under such conditions, sensor values obtained from LIDAR mounted on a roof rack may be relatively trustworthy. If however, the ego vehicle is traveling on a highway, then sensor values obtained from RADAR may be relatively trustworthy.

As another example, sensor values obtained from a camera may be relatively untrustworthy in low-light conditions (resulting in a black image), or in high-light conditions (resulting in a washed-out white image).

The trustworthiness may be determined by a trust estimator trained based on previously-collected driving data. For example, the driving data may indicate a predicted trajectory for a vehicle and an actual trajectory taken by the vehicle. The trajectory may have been predicted based on sensor values from the same (or similar) one or more sensors as the ego vehicle, obtained under the same (or similar) ambient conditions. The trust estimator may be trained based on computed differences of the predicted trajectories and the actual trajectories. Based on this training, the trust estimator can determine a trustworthiness of sensor values obtained from the one or more sensors under the current conditions. For example, trustworthiness can be a difference between a predicted occurrence and an actual occurrence over all modes or a likelihood of what occurred, given the prediction. A mode may be a trajectory position, other vehicle positions, etc.

In one aspect, a confidence estimator generates a confidence level for an output of a subsystem of the ego vehicle. The confidence level indicates a confidence in the accuracy of the output of the subsystem. The output of the subsystem is based on the obtained sensor values, and the confidence level is generated based (at least in part) on the trustworthiness of the obtained sensor values.

For example, the ego vehicle may provide the sensor values to a trajectory predictor, which generates a predicted trajectory of the ego vehicle (or another vehicle) based on the sensor values. The ego vehicle may determine that the obtained sensor values are relatively untrustworthy, and thus the confidence estimator may generate a low confidence level for the predicted trajectory. Accordingly, even if the trajectory predictor predicts a high likelihood that the ego vehicle will take a given trajectory, the ego vehicle may decide not to pass this predicted trajectory to a different subsystem because of the low confidence in the high-likelihood trajectory.

In one aspect, a trajectory predictor generates a confidence level separate from the confidence level generated by the confidence estimator. Similar to the confidence level generated by the confidence estimator, the confidence level generated by the trajectory predictor indicates a confidence in the accuracy of a predicted trajectory (i.e., an output) generated by the trajectory predictor (i.e., a subsystem). However, unlike the confidence level generated by the confidence estimator, the confidence level generated by the trajectory predictor does not separately take into account the trustworthiness of the obtained sensor values. By taking into account the ambient conditions, the ego vehicle determines not only a fidelity of a model (e.g., the trajectory predictor), but also the trustworthiness of the overall output of the subsystem.

FIG. 1A illustrates an example of a vehicle 100 (e.g., ego or host vehicle) in an environment 150 according to aspects of the present disclosure. In the present example, the vehicle 100 is an autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D RGB camera, and a LIDAR sensor 106. Other sensors, such as RADAR and/or ultrasound, are also contemplated. Additionally, or alternatively, the vehicle 100 may include one or more additional 2D cameras and/or LIDAR sensors. For example, the additional sensors may be side facing and/or rear facing sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, the artificial neural network (e.g., autonomous driving system) of the vehicle 100 may extract height and/or depth features from the first output stream. The autonomous driving system of the vehicle 100 may also extract height and/or depth features from the second output stream.

The information obtained from the sensors 106, 108 may be used to evaluate a driving environment. For example, the information obtained from the sensors 106, 108 may be used to identify objects in the vehicle's 100 blind spots. The information may be used to generate one or more localized notifications.

Figure 1B:
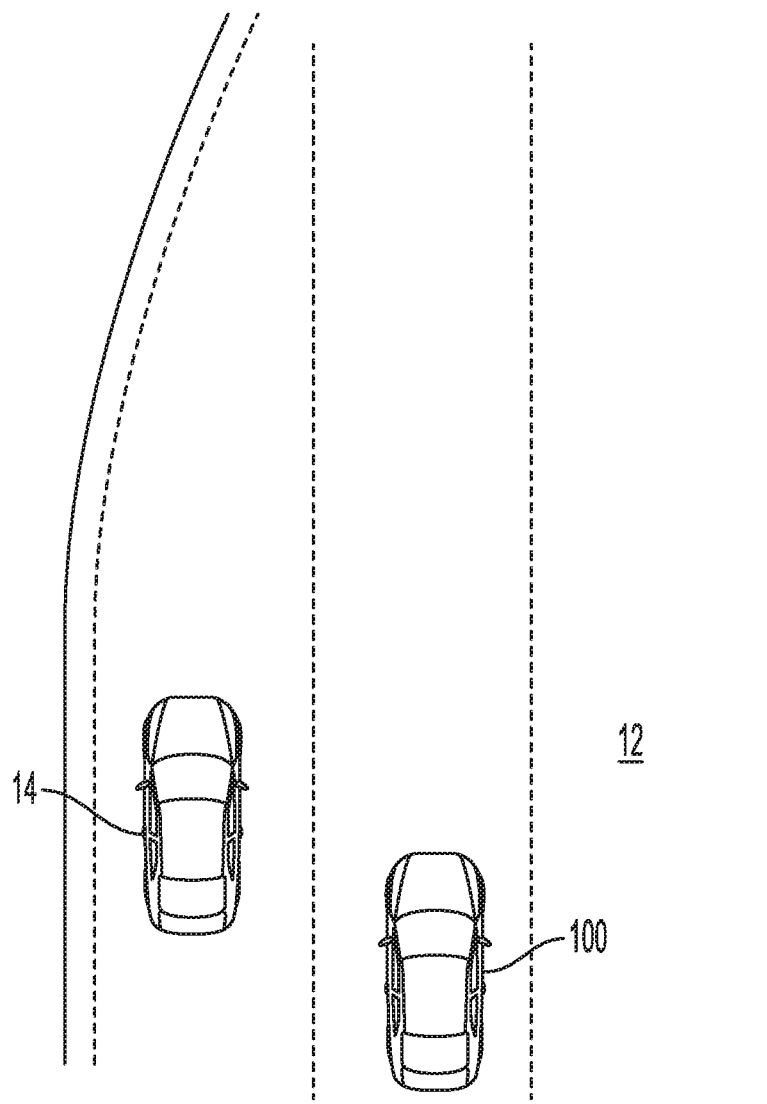
FIGS. 1B and 1C are top views of an example of a roadway including a host vehicle having an external environment and surrounding vehicle located therein according to one aspect of the disclosure.
Figure 1C:
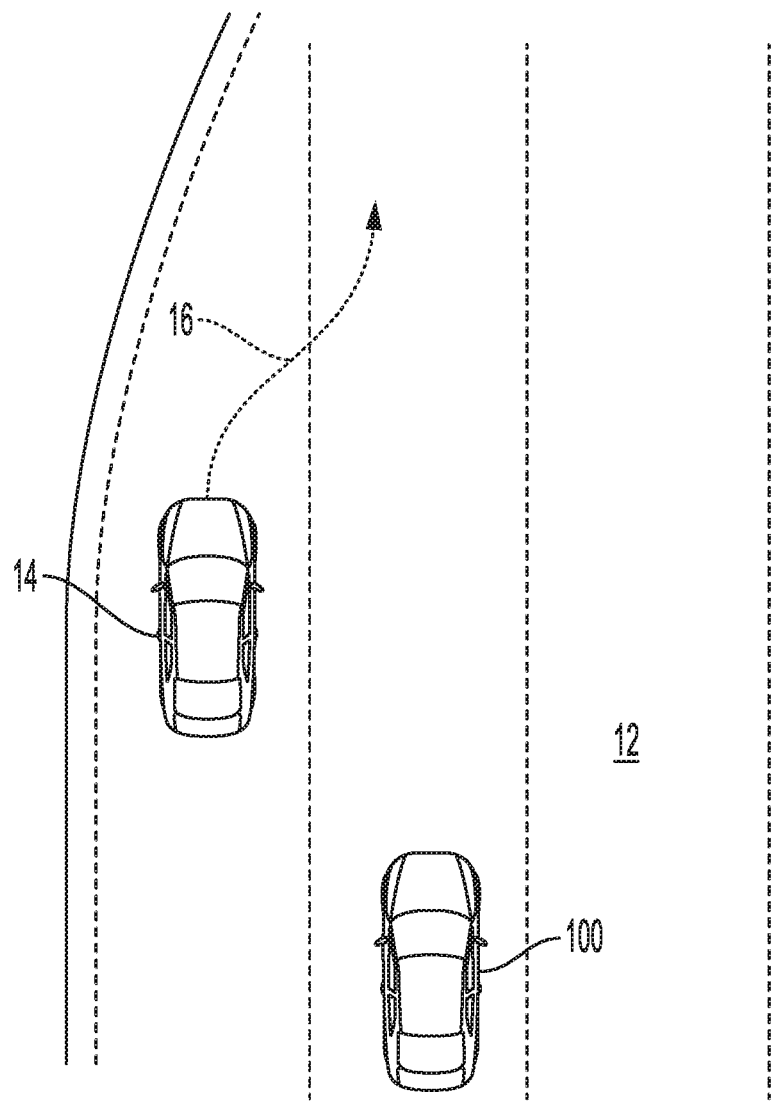

Referring now to FIG. 1B and FIG. 1C, top views of an example of a roadway including a host vehicle 100 having an external environment 12 and a surrounding vehicle 14 located therein are shown. The system can include a host vehicle 100. The host vehicle 100 can be any suitable type of vehicle. The host vehicle 100 can be any form of transportation that is at least partially motorized. In one or more arrangements, the host vehicle 100 can be an automobile. While arrangements will be described herein with respect to automobiles, it should be understood that examples and implementations are not limited to automobiles. In one or more arrangements, the host vehicle 100 can be a watercraft, an aircraft, a space craft, a golf cart, a motorcycle, and/or any other form of transportation that is at least partially motorized.

The host vehicle 100 can be located in any location. For example, the host vehicle 100 can be traveling along a roadway. The host vehicle 100 can have an associated external environment 12. The external environment 12 can be areas surrounding the host vehicle 100, and/or any portion(s) thereof. One or more objects can be located in the external environment 12 of the host vehicle 100. For example, one or more objects can be a vehicle surrounding the host vehicle 100 that is also traveling along the roadway. There can be any number of surrounding vehicles 14 in the external environment 12 of the host vehicle 100. While only one surrounding vehicle 14 is shown in FIGS. 1B and 1C, it will be understood that arrangements described herein are not limited in this respect. In fact, there can be greater than one surrounding vehicle 14 located in the external environment 12 of the host vehicle 100. Additionally or alternatively, there can be no surrounding vehicles located in the external environment 12 of the host vehicle 100.

As will be described herein, the host vehicle 100 can monitor the external environment 12 of the host vehicle 100. The host vehicle 100 can detect an object located in the external environment 12 of the host vehicle 100. The host vehicle 100 can classify the object as the surrounding vehicle 14. The host vehicle 100 can predict a trajectory 16 for the surrounding vehicle 14. The predicted trajectory 16 can be a course of action, direction, orientation, and/or travel path for the surrounding vehicle 14. As will be discussed below, the predicted trajectory 16 can be determined based on any of one or more predetermined vehicle characteristics, and one or more current driving characteristics for the surrounding vehicle 14. The predetermined vehicle characteristics can be based on a type of the surrounding vehicle 14. The current driving characteristics can be obtained from sensor data of a sensor system of the host vehicle 100.

Figure 2:
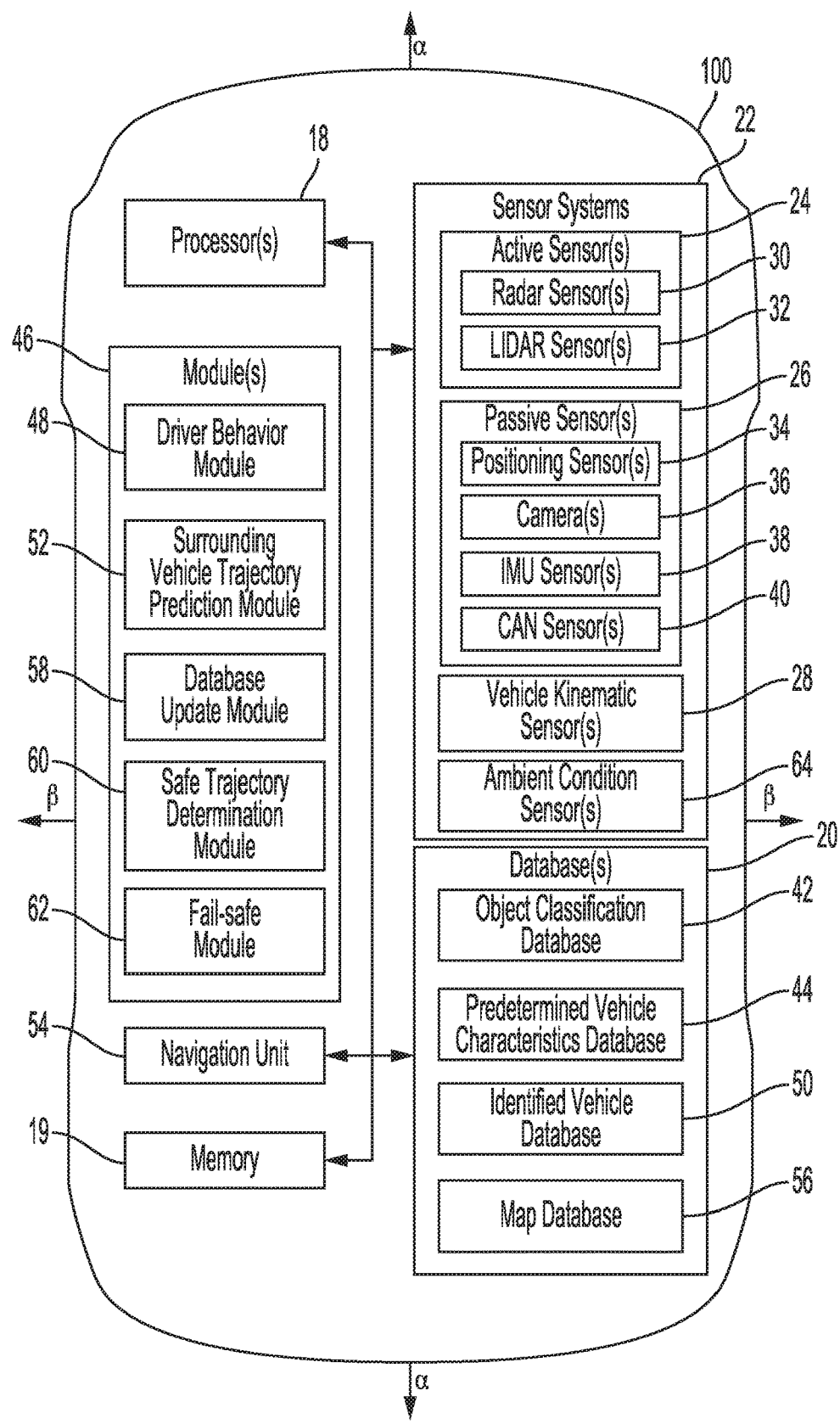
FIG. 2 is a schematic block diagram of an example of the host vehicle of FIGS. 1B and 1C being configured to predict trajectories of the surrounding vehicle or of the host vehicle according to one aspect of the disclosure.

Referring now to FIG. 2, a schematic block diagram of an example of the host vehicle 100 being configured to predict a trajectory (e.g., trajectory 16) of the host vehicle 100 or of the surrounding vehicle 14 shown in FIGS. 1B and 1C. The host vehicle 100 can include various elements. Some of the possible elements of the host vehicle 100 are shown in FIG. 2 and will now be described. However, it should be understood that it is not necessary for the host vehicle 100 to include all of the elements shown in FIG. 2 or described herein. The host vehicle 100 can have any combination of the various elements shown in FIG. 2. Furthermore, the host vehicle 100 can have additional elements to those shown in FIG. 2. Further, while various elements are shown as being located within the host vehicle 100 in FIG. 2, it should be understood that one or more of these elements can be located external to the host vehicle 100. Further, the elements shown may be physically separated by large distances.

The host vehicle 100 can include one or more processor(s) 18. The processor(s) 18 can be any component or group of components that are configured to execute any of the processes described herein or any form of instructions to carry out such processes or cause such processes to be performed. The processor(s) 18 can be implemented with one or more general-purpose and/or special-purpose processors. Examples of suitable processor(s) 18 can include microprocessors, microcontrollers, digital signal processors, and other circuitry that can execute software. Further examples of suitable processor(s) 18 include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 18 can include at least one hardware circuit (e.g., an integrated circuit) configured to carry out instructions contained in program code. In arrangements in which there is a plurality of processor(s) 18, such processors can work independently from each other or one or more processors can work in combination with each other. In one or more arrangements, the processor(s) 18 can be a main processor of the host vehicle 100. For instance, the processor(s) 18 can be an electronic control unit (ECU).

The host vehicle 100 can include computer readable medium. In one or more arrangements, the computer readable medium can be memory 19. The memory 19 can include volatile and/or non-volatile memory. Examples of suitable memory 19 includes RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 19 can include instructions in program code stored thereon. Such instructions can be executed by the processor(s) 18, and/or one or more modules of the host vehicle 100. In one or more arrangements, the memory 19 can be a component of the processor(s) 18. In one or more arrangements, the memory 19 can be operatively connected to the processor(s) 18, and/or one or more modules of the host vehicle 100 and used thereby. Operatively connected can include direct or indirect connections, including connections without direct physical contact.

The host vehicle 100 can include one or more database(s) 20 for storing one or more types of data. The database(s) 20 can be a component of the memory 19, the processor(s) 18, or the database(s) 20 can be operatively connected to the processor(s) 18 and/or memory 19 for use thereby.

The host vehicle 100 can also include a sensor system 22. The sensor system 22 can include one or more sensors. The one or more sensors can be configured to monitor something in the external environment 12 (shown in FIGS. 1B and 1C) of the host vehicle 100. In one or more arrangements, the one or more sensors can be configured to monitor in real-time. Real-time can be a level of processing responsiveness that a user or system senses as sufficiently immediate for a particular process or determination to be made, or that enables the processor to keep up with some external process. The sensor system 22 can be positioned anywhere in or on the host vehicle 100. The sensor system 22 can at least partially include existing systems of the host vehicle 100, such as backup sensors, lane keeping sensors, and/or front sensors, just to name a few possibilities.

In arrangements in which the sensor system 22 includes a plurality of sensors, the plurality of sensors can be distributed about the host vehicle 100 in any suitable manner. The sensors can work independently from each other or in combination with each other. In such case, the two or more sensors can form a sensor network.

The sensor system 22 can include one or more sensors configured to sense the external environment 12 of the host vehicle 100 or portions thereof. For instance, the sensor system 22 can be configured to acquire data of at least a forward portion and/or at least a rearward portion of the external environment 12 of the host vehicle 100. For example, the sensor system 22 can monitor the forward portion along the longitudinal direction α in front of the host vehicle 100, and/or monitor the rearward portion along the longitudinal direction α behind the host vehicle 100.

Additionally or alternatively, the sensor system 22 can be configured to acquire data of at least a side portion of the external environment 12 of the host vehicle 100. The side portion can be, for example, a portion of the external environment 12 that is located between the forward portion and the rearward portion of the host vehicle 100. For example, the sensor system 22 can be configured to monitor a left side and/or a right side portion along a lateral direction β of the host vehicle 100.

The sensor system 22 can be operatively connected to the processor(s) 18, the database(s) 20, the memory 19, and/or any other components, elements, and/or modules of the host vehicle 100. Various examples of possible sensors of the sensor system 22 will be described herein. However, it will be understood that the disclosure is not limited to the particular sensors described. The sensor system 22 can include categories of sensors, such as active sensor(s) 24, passive sensor(s) 26, and/or vehicle kinematic sensor(s) 28.

Active sensor(s) 24 can be any sensor or group of sensors configured to actively radiate a signal for purposes of quantifying or qualifying something. For example, the active sensor(s) 24 can radiate an electromagnetic signal, a radio signal, a laser signal, or the like. Such signals can be radiated into the external environment 12 of the host vehicle 100. Examples of such active sensor(s) 24 can include radar sensor(s) 30, LIDAR sensor(s) 32, or the like.

In one or more arrangements, the active sensor(s) 24 can include one or more radar sensor(s) 30. The radar sensor(s) 30 can be any device, component and/or system that can detect something using at least in part radio signals. The radar sensor(s) 30 can be configured to detect the presence of one or more objects in the external environment 12 of the host vehicle 100, the position of each detected object relative to the host vehicle 100, the distance between each detected object and the host vehicle 100 in one or more directions (e.g. in the longitudinal direction a, the lateral direction and/or other direction(s)), the elevation of each detected object, the speed of each detected object, and/or the movement of each detected object. The radar sensor(s) 30, or data obtained thereby, can determine or be used to determine the speed, position, and/or orientation of objects in the external environment 12 of the host vehicle 100. The radar sensor(s) 28 can have three dimensional coordinate data associated with the obj ects.

In one or more arrangements, the active sensor(s) 24 can include LIDAR sensor(s) 32. The LIDAR sensor(s) 32 can be any device, component and/or system that can detect something using at least in part electromagnetic signals. In one or more arrangements, the electromagnetic signals can be laser signals. The LIDAR sensor(s) 32 can include a laser source and/or laser scanner configured to emit a laser signal and a detector configured to detect reflections of the laser signal. The LIDAR sensor(s) 32 may be configured to operate in a coherent or an incoherent detection mode.

The LIDAR sensor(s) 32 can be configured to detect the presence of one or more objects in the external environment of the host vehicle 100, the position of each detected object relative to the host vehicle 100, the distance between each detected object and the host vehicle 100 in one or more directions, the elevation of each detected object, the speed of each detected object, and/or the movement of each detected object. Exemplary LIDAR sensor(s) 32 can include, for example, Velodyne® LIDAR systems.

Passive sensor(s) 26 can be any sensor or group of sensors configured to receive signals broadcast from something independent of the passive sensor(s) 26. Such received signals can be broadcast from something located in the external environment 12 of the host vehicle 100. Additionally or alternatively, such received signals can be broadcast from any component or group of components of the host vehicle 100 independent of the passive sensor(s) 26. For example, the passive sensor(s) 26 can receive electromagnetic signals, radio signals, laser signals, or the like. Examples of such passive sensor(s) 26 can include positioning sensor(s) 34, camera(s) 36, IMU sensor(s) 38, CAN sensor(s) 40, or the like.

In one or more arrangements, the passive sensor(s) 26 can include positioning sensor(s) 34. The positioning sensor(s) 34 can be one or more components or group of components configured to determine the geographic location of the host vehicle 100.

The positioning sensor(s) 34 can include a global positioning system, a local positioning system, and/or a geolocation system. The positioning sensor(s) 34 may include a transceiver configured to estimate a position of the host vehicle 100 with respect to the Earth. For example, positioning sensor(s) 34 can include a GPS transceiver to determine the vehicle's latitude, longitude and/or altitude. The positioning sensor(s) 34 can use other systems (e.g. laser-based localization systems, inertial-aided GPS, and/or camera-based localization) to determine the location of the host vehicle 100. It should be understood that many various systems or components can be substituted and/or supplemented to the positioning sensor(s) 34 to determine the location of the host vehicle 100 without departing from the scope of this disclosure.

In one or more arrangements, the passive sensor(s) 26 can include one or more camera(s) 36. The camera(s) 36 can be any device, component, and/or system that can capture visual data. The visual data can include video and/or image information/data. The visual data can be in any suitable form. In one or more arrangements, visual data can include heat signatures, thermal images, and/or thermal video of a portion of the external environment 12 of the host vehicle 100.

The camera(s) 36 can be any suitable type of camera. For instance, the camera(s) 36 can be high resolution cameras, high dynamic range (HDR) cameras, infrared (IR) cameras, and/or thermal imaging cameras.

In one or more arrangements, camera(s) 36 can be positioned to capture visual data from at least a portion of the external environment 12 of the host vehicle 100. In one or more arrangements, camera(s) 36 can be positioned to capture visual data from at least a rearward portion of the external environment of the host vehicle 100. As a further example, camera(s) 36 can be positioned to acquire visual data from at least a left side portion and/or a right side portion of the external environment of the host vehicle 100.

The camera(s) 36 can be located in any suitable portion of the host vehicle 100. For instance, camera(s) 36 can be located within the host vehicle 100. One or more of the camera(s) 36 can be located on the exterior of the host vehicle 100. One or more of the camera(s) 36 can be located on or exposed to the exterior of the host vehicle 100. Additionally or alternatively, one or more of the camera(s) 36 can be located on a side of the host vehicle 100. As another example, one or more of the camera(s) 36 can be located on the roof of the host vehicle 100.

In one or more arrangements, the camera(s) 36 can be one or more backup cameras. The backup camera can be a camera configured to acquire visual data of a rearward portion of the external environment 12 of the host vehicle 100. In some arrangements, the one or more backup cameras can capture visual data of at least a portion of the rearward portion of the external environment when the host vehicle 100 is not in a reverse gear mode and/or is otherwise moving in reverse. Alternatively, or in addition, the camera(s) 36 can include other cameras that may be used in the host vehicle 100.

In one or more arrangements, the passive sensor(s) 26 can include inertial measurement unit (IMU) sensor(s) 38. The IMU sensor(s) 38 can be operatively connected to an IMU (not shown) of the host vehicle 100. The IMU can be one or more mechanisms, devices, elements, components, systems, applications and/or combinations thereof, configured to determine inertial characteristics of the host vehicle 100. Such inertial characteristics can include, for example, velocity, orientation, gravitational forces (G-forces), or the like. The IMU sensor(s) 38 can determine inertial characteristics of the host vehicle 100, using accelerometers, gyroscopes, etc. The IMU sensor(s) 38 can be configured to monitor data received from the IMU of the host vehicle 100.

In one or more arrangements, the passive sensor(s) 26 can include controller area network (CAN) sensor(s) 40. The CAN sensor(s) 40 can be operatively connected to a CAN bus (not shown) of the host vehicle 100. The CAN bus can be one or more components operatively connected to one another, communicating via a network in the host vehicle 100. The network can be a wired network and/or a wireless network. The CAN sensor(s) 40 can be configured to monitor, assess, and/or evaluate data transmitted over the CAN bus of the host vehicle 100.

The vehicle kinematic sensor(s) 28 can be any component or group of components configured to detect a position, velocity, speed, and/or acceleration of the host vehicle 100. The vehicle kinematic sensor(s) 28 can detect the position, velocity, speed, and/or acceleration of the host vehicle 100 using many sensors already present or existing in vehicles. Such sensors can include, for example, tachometer(s), steering angle sensor(s), wheel angle sensor(s), wheel speed sensor(s), or any other sensor(s) capable of detecting the position, velocity, speed, and/or acceleration of the host vehicle 100.

The sensor system 22 can be configured to monitor the external environment 12 of the host vehicle 100, including objects detected in the external environment 12. Responsive to detecting an object in the external environment 12 of the host vehicle 100, the host vehicle 100 can classify the object.

In one or more arrangements, the host vehicle 100 can include an object classification database 42. The object classification database 42 can include data corresponding to the classification of various objects. For example, the object classification database 42 can include data corresponding to features of various vehicles, on-road or off-road objects, and roadway attributes. Such features can be in the form of an image stored on the object classification database 42, a typical reading from the one or more sensors in the sensor system 22 indicative of the particular type of object, and/or any other form of data useful for classifying objects. Examples of various vehicles, on-road or off-road objects, and roadway attributes include, for example, vehicles, motorcycles, trees, pedestrians, bicyclists, animals, roadway signs, barricades, or any other objects typically found on or along a roadway.

The features stored on the object classification database 42 can be compared to data captured from the sensor system 22. For example, an image of a vehicle stored on the object classification database 42 can be compared to images of an object in the external environment 12 captured from the camera(s) 36. Such comparison can be performed by image processing software generally known in the art. The image processing software can be implemented on the processor(s) 18. Responsive to the comparison of the vehicle being substantially the same as the object in the external environment 12, the host vehicle 100 can determine that the object in the external environment 12 is a surrounding vehicle 14.

Additionally or alternatively, the object classification database 42 can store data readings that are typical of the particular type of objects. For example, the object classification database 42 can store data from a typical LIDAR sensor reading indicative of a tree present. The data from the typical LIDAR sensor reading can be compared to data received from the LIDAR sensor(s) 32. Responsive to the comparison of the typical LIDAR sensor reading being substantially the same as the object in the external environment 12 as detected by the LIDAR sensor(s) 32, the host vehicle 100 can determine that the object in the external environment is a tree. Substantially the same can be, for example, within one standard deviation, within half a standard deviation, within a quarter of a standard deviation, etc. Although the previous two examples have been provided for purposes of clarity, any types of data can be stored on the object classification database 42 for comparison to data obtained via the sensor system 22. As a result of the comparison, the objects detected in the external environment 12 of the host vehicle 100 can be classified.

The object classification database 42 can further include data indicative of various types of vehicles. Examples of the types of vehicles can include sedans, sport utility vehicles (SUVs), convertibles, pick-up trucks, semi-trucks, campers, motorcycles, tractors, specific brands or models of vehicles, and/or any other sub-classes of vehicles. Accordingly, responsive to detecting that the object is a surrounding vehicle 14, the host vehicle 100 can determine a type of the surrounding vehicle 14. For example, the processor(s) 18 can receive data from the sensor system 22. The data can be indicative of the object located in the external environment 12 being a surrounding vehicle 14. Responsive to determining the object is the surrounding vehicle 14, the processor(s) 18 can compare the data to various types of vehicles stored on the object classification database 42. The processor(s) 18 can determine that the surrounding vehicle 14 is, for example, a convertible, based on a comparison of the data received from sensor system 22 with data stored on the object classification database 42 indicative of typical sensor readings when a convertible is present in the external environment 12.

The host vehicle 100 can further include a predetermined vehicle characteristics database 44. The predetermined vehicle characteristics database 44 can include one or more predetermined vehicle characteristics for various types of vehicles. The predetermined vehicle characteristics can be indicative of a driving behavior for types of vehicles. The predetermined vehicle characteristics can be indicative of at least one driving behavior associated with a plurality of vehicles having the same type. For example, the predetermined vehicle characteristics for a convertible can be more aggressive as compared to the predetermined vehicle characteristics for a semi-truck.

The predetermined vehicle characteristics can be a number on a scale, a percentage of aggressiveness, a weighted factor as compared to a standard sedan, or any other way of characterizing a driving style. For example, the predetermined vehicle characteristics of the standard sedan can be 50% of aggressiveness, whereas the predetermined vehicle characteristics of a convertible can be 80% of aggressiveness. Additionally or alternatively, the predetermined vehicle characteristics of the standard sedan can be a 1.0 factor of aggressiveness, whereas the predetermined vehicle characteristics of a semi-truck can be a 0.5 factor of aggressiveness. Although the previous two examples have been provided, it should be understood that various weight factors and percentages can be used to correspond with various classes of vehicle, and it is not intended that the weighted factor for particular classes of vehicles are limited to the examples provided. In fact, many different ways of characterizing driving styles for particular classes of vehicles can be used.

Additionally or alternatively, the predetermined vehicle characteristics can be categorized as driving behaviors for specific maneuvers. For example, the predetermined vehicle characteristics for an SUV may include data indicative that they tend to speed in inclement weather relative to other vehicles, yet drive at average speeds in normal weather, that they tend to prefer the center lane, and tend to change lanes at a slow rate relative to other vehicles. Also, the predetermined vehicle characteristics for a convertible may include data indicative that they tend to drive slower in inclement weather relative to other vehicles, yet drive at faster speeds in normal weather, that they tend to prefer the fast lane, and they tend to change lanes at a fast rate relative to other vehicles. Although the previous two examples are provided, it should be noted that the present disclosure is not limited to these two examples. In fact, any ways of profiling various types of vehicles can be used in the predetermined vehicle characteristics database 44. Additionally, different levels of profiling can be incorporated, including profiling based on the classification of vehicle (e.g., sedan, SUV, convertible, pick-up truck, etc.), the brand of vehicle (e.g., Toyota, Lexus, Honda, Ford, Dodge, etc.), the model of the vehicle (e.g., Toyota Camry, Lexus IS, Honda Accord, Ford Flex, Dodge Charger, etc.), and/or any other levels of profiling that could be used to differentiate driving styles based on specific types of vehicles.

The host vehicle 100 may include various subsystems (e.g., a trajectory predictor). The various subsystems may be represented as various module(s) 46. An example of a subsystem is a trajectory predictor, such as the safe trajectory determination module 60 or the surrounding vehicle trajectory prediction module 52. Other subsystems may be directed to the driver behavior, fail-safe, database update, etc. The various module(s) 46 perform various tasks in the host vehicle 100. The module(s) 46 can be implemented as computer readable program code that, when executed by the processor(s) 18, implement one or more of the various processes described herein. Such computer readable program code can be stored on the memory 19. The module(s) 46 can be a component of the processor(s) 18, or the module(s) 46 can be executed on and/or distributed among other processing systems to which the processor(s) 18 are operatively connected. The module(s) 46 can include instructions (e.g., program logic) executable by the processor(s) 18. Additionally or alternatively, the memory 19 can contain such instructions. The various module(s) 46 can be operatively connected to the processor(s) 18, the database(s) 20, and/or the sensor system 22. Various examples of module(s) 46 that the host vehicle 100 can include will be described herein.

In one or more arrangements, the host vehicle 100 can include a driver behavior module 48. The driver behavior module 48 can receive the predetermined vehicle characteristics from the predetermined vehicle characteristics database 44 to determine a driver behavior of identified surrounding vehicles 14.

Additionally or alternatively, the driver behavior module 48 can receive data from the sensor system 22. The data received from the sensor system 22 can be indicative of the driver behavior of the identified surrounding vehicles 14. In such an example, data received from the sensor system 22 can be used to both classify objects located in the external environment, and to determine the driver behavior of surrounding vehicles 14. The driver behavior module 48 can use both the predetermined vehicle characteristics received from the predetermined vehicle characteristics database 44, and data received from the sensor system 22 to determine driver behaviors. Such data received from the sensor system 22 can be determinative or used to determine current driving characteristics for the surrounding vehicle 14. The current driving characteristics can be indicative of one or more driving behaviors. For example, the current driving characteristics can be a number on a scale, a percentage of aggressiveness, a weighted factor as compared to a standard sedan, or any other way of characterizing one or more driving behaviors for the surrounding vehicle 14 based on data obtained from the sensor system 22. Examples of such data include changes in direction, speed, acceleration, lane position, and/or any other types of data that can be useful to determine driver behavior of the surrounding vehicle 14.

In one or more arrangements, the current driving characteristics can be substantially the same as the predetermined vehicle characteristics for the surrounding vehicle 14. In such an example, the surrounding vehicle 14 has one or more driving behaviors consistent with the type of the surrounding vehicle. In one or more arrangements, the current driving characteristics can be different from the predetermined vehicle characteristics. In such an example, the surrounding vehicle 14 does not portray the one or more driving behaviors consistent with the type of the surrounding vehicle. The driver behavior module 48 can use both the predetermined vehicle characteristics received from the predetermined vehicle characteristics database 44, and data received from the sensor system 22 to determine driver behaviors.

The host vehicle 100 can further include an identified vehicle database 50. The host vehicle 100 can record an identifier for the surrounding vehicle 14. Such identifier can include, for example, a license plate number, a vehicle identification number, or any other types of identifiers commonly used to differentiate between individual vehicles. The identifier can be stored on the identified vehicle database 50. Additionally or alternatively, the predetermined vehicle characteristics for the surrounding vehicle 14 can also be stored on the identified vehicle database 50. In such an example, the predetermined vehicle characteristics can be associated with the identifier, and both the identifier and the associated predetermined vehicle characteristics can be stored on the identified vehicle database 50.

In one or more arrangements, the host vehicle 100 can include a surrounding vehicle trajectory prediction module 52. The surrounding vehicle trajectory prediction module 52 can predict a trajectory for the surrounding vehicle 14 based on any one of the predetermined vehicle characteristics for the surrounding vehicle 14, and the current driving characteristics based on the data received from the sensor system 22. Referring now to FIGS. 1B, 1C, and FIG. 2, the surrounding vehicle 14 is shown in the left lane relative to the host vehicle 100. The host vehicle 100 can determine the type of the surrounding vehicle 14, for example, a convertible. The host vehicle 100 can also detect, using data received from the sensor system 22, that the surrounding vehicle 14 has accelerated relative to the host vehicle 100, and that the surrounding vehicle 14 has shifted its position laterally towards the lane marker directly adjacent to and in-between the host vehicle 100 and the surrounding vehicle 14. The sensor system may also include a lane marking sensor (not shown) used to monitor the sensing vehicle or object (e.g. other vehicle) position within a lane, or other sensors responsive to road markings, traffic signals, signs, or the presence of emergency vehicles. Such sensor data can be used to establish the path of lanes within a world model, and hence for predicted path calculations.

Additionally or alternatively, the host vehicle 100 can access map data from a navigation unit 54 of the host vehicle 100, which would indicate that the left lane is ending ahead. The host vehicle 100 can use the data received from any one of the predetermined vehicle characteristics database 44, the sensor system 22, and the map data from the navigation unit 54 to predict the trajectory 16 of the surrounding vehicle 14. The navigation unit 54 can be integrated into a head-unit (not shown) of the host vehicle 100, or it can be a stand-alone, or aftermarket, component. The navigation unit 54 can include the map data stored thereon (e.g., stored on a database included in the navigation unit 54), or the host vehicle 100 can further include a map database 56. Additionally or alternatively, the navigation unit 54 can be integrated into an occupant's mobile device, and the map data can be stored thereon. In such an example, the host vehicle 100 can access the occupant's mobile device, and retrieve the map data stored thereon.

Additionally, each of the types of data received may have a corresponding confidence level. Referring now to FIG. 2, the surrounding vehicle trajectory prediction module 52 can evaluate the confidence levels of the predetermined vehicle characteristics, the current driving characteristics, and the map data. Such confidence levels can be used to optimize the predicted trajectory 16 for the surrounding vehicle 14. For example, if some of the sensors in the sensor system 22 are not performing optimally, or are in a failed state, the current driving characteristics may have a lower confidence level. The confidence level may be a scaled number, a percentage confidence, a weighted factor, or any other way of characterizing a level of confidence in data.

The surrounding vehicle trajectory prediction module 52 can evaluate the confidence levels for any of the predetermined vehicle characteristics, the current driving characteristics, and the map data for the surrounding vehicle 14, and predict the trajectory 16 for the surrounding vehicle 14. In one or more arrangements, the predicted trajectory 16 can also have a corresponding confidence level. Much like the previously described confidence levels, the confidence level for the predicted trajectory 16 can be a scaled number, a percentage confidence, a weighted factor, or any other way of characterizing a level of confidence in data.

In one or more arrangements, the host vehicle 100 can include a database update module 58. The database update module 58 can be configured to update any of the database(s) 20. Such an update can be performed based on various factors. In one or more arrangements, the database update module 58 can receive a prompt for an update. Such a prompt can be received by similar methods typically used to update software and databases generally known in the art. For example, the prompt can be received at a car dealership, or wirelessly.

In one or more arrangements, the database update module 58 can determine that an update is necessary. Such determination can be made for specific types of vehicles, or for specifically identified vehicles. Accordingly, in such an example, the database update module 58 can update any one of the predetermined vehicle characteristics database 44, and the identified vehicle database 50. The database update module 58 can compare the predetermined vehicle characteristics for the surrounding vehicle 14 with the identified driving characteristics of the surrounding vehicle 14. Where the predetermined vehicle characteristics and the identified driving characteristics are different, the database update module 58 can determine that an update to any one of the predetermined vehicle characteristics database 44, and the identified vehicle database 50. For example, the database update module 58 can update the identified vehicle database 50 responsive to the identified driving characteristics being different from the predetermined vehicle characteristics, and the identified driving characteristics are not within, for example, one standard deviation of the predetermined vehicle characteristics, two standard deviations of the predetermined vehicle characteristics, three standard deviations of the predetermined vehicle characteristics, etc. The database update module 58 can update the predetermined vehicle characteristics stored on the identified vehicle database 50 corresponding to the identifier, the identifier corresponding to the surrounding vehicle 14. Additionally or alternatively, the database update module 58 can update the predetermined vehicle characteristics database 44 responsive to the identified driving characteristics being different from the predetermined vehicle characteristics, but is, for example, within one standard deviation of the predetermined vehicle characteristics.

The host vehicle 100 can include a safe trajectory determination module 60. The safe trajectory determination module 60 can determine a safe trajectory for the host vehicle 100 to follow. The safe trajectory can be, for example, a trajectory where the host vehicle 100 will not cross the predicted trajectory 16 for the surrounding vehicle 14. In some instances, such safe trajectory can be following a previously planned trajectory for the vehicle when the previously planned trajectory of the host vehicle 100 is determined as being safe. The safe trajectory can be determined using any of the predicted trajectory from the surrounding vehicle trajectory prediction module 52, the current driving characteristics from the sensor system 22, the predetermined vehicle characteristics from the predetermined vehicle characteristics database 44 based on the type of the surrounding vehicle 14, the map data from the navigation unit 54, and any other data usable to determine the safe trajectory of the surrounding vehicle. The safe trajectory can include a confidence level. The confidence level for the safe trajectory can be a scaled number, a percentage confidence, a weighted factor, or any other way of characterizing a level of confidence in data.

The host vehicle 100 can follow the safe trajectory responsive to one or more of the sensors in the sensor system 22 changing from an active state to a failed state. The active state can be actively, consistently, periodically, and/or predictably receiving reliable data from the sensor. The failed state can be inconsistently receiving data, receiving unreliable or outlying data, the sensor being in a deactivated state, the sensor being in a passive state, the sensor being in a sleep mode, etc. An example of a sensor being in a failed state can be an instance where it is snowing outside of the vehicle, and some sensors (e.g., camera(s) 36, radar sensor(s) 30) may receive unreliable data. In these instances, the sensors receiving unreliable data can be considered in the failed state. Responsive to one or more of the sensors in the sensor system 22 being in the failed state, the host vehicle 100 can follow the safe trajectory.

Additionally or alternatively, the host vehicle 100 can follow the safe trajectory responsive to one of the categories of sensors (e.g., the active sensor(s) 24, the passive sensor(s) 26, the vehicle kinematic sensor(s) 28) being in the failed state. In one or more arrangements, the host vehicle 100 can use the safe trajectory and the sensors in the active state, when one or more of the categories are in the failed state. For example, when the active sensor(s) 24 are in the failed state, and the passive sensor(s) 26, and vehicle kinematic sensor(s) 28 are in the active state, the safe trajectory determination module 60 can determine the safe trajectory based on the predicted trajectory as determined by the surrounding vehicle trajectory prediction module 52, the passive sensor(s) 26, and the vehicle kinematic sensor(s) 28. Also, where the passive sensor(s) 26 are in the failed state, and the active sensor(s) 24 and the vehicle kinematic sensor(s) 28 are in the active state, the safe trajectory determination module 60 can determine the safe trajectory based on the predicted trajectory as determined by the surrounding vehicle trajectory prediction module 52, the active sensor(s) 24, and the vehicle kinematic sensor(s) 28. Also, where both the active sensor(s) 24 and passive sensor(s) 26 are in the failed state, and the vehicle kinematic sensor(s) 28 are in the active state, the safe trajectory determination module 60 can determine the safe trajectory based on the predicted trajectory as determined by the surrounding vehicle trajectory prediction module 52, and the vehicle kinematic sensor(s) 28.

The host vehicle 100 can include a fail-safe module 62. In instances where the safe trajectory includes the confidence level, the fail-safe module 62 can compare the confidence level for the safe trajectory to a threshold. The threshold can be, for example, a threshold scaled number, a threshold percentage confidence, a threshold weighted factor, or any other way of setting a threshold for a level of confidence in data. Where the confidence level for the safe trajectory is, for example, below the threshold confidence level, the host vehicle 100 can execute a fail-safe. Such threshold can be a minimum level of confidence, otherwise the host vehicle 100 executes the fail-safe. Alternatively, a maximum level of un-confidence (e.g., inverse of confidence) can be used as a threshold, where if the confidence level is above the maximum level of un-confidence threshold, the host vehicle 100 executes the fail-safe. The fail-safe can be, for example, stopping the host vehicle 100, pulling the host vehicle 100 over to a side of the road, slowing the host vehicle 100 down, idling the host vehicle 100, or any other fail-safes for the host vehicle 100 to safely disable, stop, and/or inhibit the host vehicle 100 from moving.

The sensor system 22 of the vehicle may also include ambient condition sensors 64, providing sensor signals correlated with ambient conditions such as external temperature, precipitation (such as rain or snow), road condition (e.g. roughness or the presence of water or ice), and the like. Ambient condition sensor data can be used to determine trustworthiness of other sensor values, and to modify models of vehicle or other object behavior. In some aspects, the ambient conditions are provided to the vehicle over a network.

The sensor system 22 can also be used to self-monitor the vehicle, for example sensing vehicle parameters such as vehicle speed, acceleration (in one or more dimensions), throttle position, engine rpm, brake operation (pedal position and/or ABS operation), steering input, yaw rate, wheel slip, passenger occupancy and weights thereof (for example, to modify a vehicle behavior model), other engine input, drive component configuration (such as road wheel angle for automobiles), control surface orientation and deployment for airplanes (such as aileron or rudder), rudder orientation for boats, nozzle configuration for spacecraft), or other parameter. The sensor system 22 may also include GPS or other position sensor for vehicle position, speed, or altitude measurements. Vehicle velocity may be determined as the time derivative of position, and acceleration as the time derivative of velocity. The sensor system 22 may also monitor the vehicle operator, for example using eye or gaze tracking, or monitoring physiological parameters, such as physiological parameters correlated with tiredness.

The sensor system 22 may also receive data from remote sources, for example over wireless communications links, or obtain data from other sources. For example, weather, road, traffic, radar, or other data may be received. Sensors may be located remote from the vehicle, for example at the roadside or embedded in the road, and communicate sensor data to the vehicle wirelessly. Sensors may be directed forwards, backwards, or to the side of the vehicle, or some combination thereof including omnidirectional sensors.

A sensor fusion element can be used, for example, to combine image data from multiple image sensors, of the same or different types, into a representation of the vehicle environment. A MIMO processor can be used for the sensor fusion element.

The safe trajectory determination module 60 or the surrounding vehicle trajectory prediction module 52 may rely on inputs from the sensor system 22 that the safe trajectory determination module 60 or the surrounding vehicle trajectory prediction module 52 should not be relying on, or may not rely on inputs from some sensors that it should be relying on. This reliance on these sensors may be detrimental to the reliability of the safe trajectory determination module 60 or the surrounding vehicle trajectory prediction module 52.

Accordingly, aspects of the present disclosure are directed to an ego vehicle (e.g., the ego or host vehicle 100) configured to determine, based on ambient conditions determined by the ego vehicle 100, a trustworthiness of sensor values or data obtained from the sensor system 22. For an output of a subsystem generated based on the obtained sensor values and/or other obtained values (e.g., outputs from database(s) 20), the ego vehicle 100 may determine a confidence in the accuracy of the output generated by the subsystem, with the confidence being based (at least in part) on the trustworthiness of the obtained sensor values. The confidence in the accuracy of the subsystem output may be separate from a confidence in the fidelity of a model (e.g., separate from a confidence in the accuracy of a given prediction generated by a trajectory predictor).

As the ambient conditions change, the ego vehicle 100 may update the trustworthiness of the sensor values from the ambient condition sensor(s) 64, and may thus update the confidence in the output accuracy of a given subsystem. In one aspect, the ego vehicle 100 obtains sensor values from the sensor system 22 and/or database values from the database(s) 20. For example, the ego vehicle 100 may be equipped with a variety of sensors and databases, and the ego vehicle 100 may obtain the sensor and/or database values from one or more of these sensors and database(s). The sensor may include, for example, the LIDAR sensors 32, the RADAR sensor(s) 30, the camera(s) 36, among many other possibilities.

The ego vehicle 100 determines one or more ambient conditions using the ambient condition sensor(s) 64 and or ambient condition information received wirelessly from a remote device. For example, the processor(s) 18 of the ego vehicle 100 may determine whether the ego vehicle is on a highway, in a crowded area, in a tunnel, at an intersection, or making a lane change based on the sensor values and other information. The ego vehicle 100 may determine the amount of cloud cover, a current time of day, whether it's daytime or nighttime based on the sensor values from the ambient sensor(s). The ego vehicle 100 could determine any combination of these or other ambient conditions.

The ego vehicle 100 determines a trustworthiness of the obtained sensor values of the active sensor(s) 24, the passive sensor(s) 26, the vehicle kinematic sensor(s) 28 and/or the database(s) 20 based on the determined ambient conditions from the ambient condition sensor(s) 64. For example, if the ego vehicle 100 is in a crowded or dense area, sensor values obtained from RADAR sensor(s) 30 may be relatively untrustworthy—e.g., because the RADAR sensor(s) 30 may be occluded and/or the sensor values may include an intolerable amount of noise. On the other hand, under such conditions, sensor values obtained from LIDAR sensor(s) 32 mounted on a roof rack of the ego vehicle 100 may be relatively trustworthy. If however, the ego vehicle 100 is traveling on a highway, then sensor values obtain from RADAR sensor(s) 30 may be relatively trustworthy.

As another example, sensor values obtained from the camera(s) 36 may be relatively untrustworthy in low-light conditions (resulting in a black image), or in high-light conditions (resulting in a washed-out white image).

The trustworthiness may be determined by a trust estimator trained based on previously-collected driving data. For example, the driving data may indicate a predicted trajectory for a vehicle and an actual trajectory taken by the vehicle. The trajectory may have been predicted based on sensor values from the same (or similar) one or more sensors as the ego vehicle 100, obtained under the same (or similar) ambient conditions. The trust estimator may be trained based on computed differences of the predicted trajectories and the actual trajectories. Based on this training, the trust estimator can determine a trustworthiness of sensor values obtained from the one or more sensors under the current conditions. In one aspect, the trust estimator may be part of the processor(s) 18. In other aspects, the trust estimator may be part of the module(s) 46.

In one aspect, a confidence estimator generates a confidence level for an output of a subsystem of the ego vehicle 100. The confidence level indicates a confidence in the accuracy of the output of the subsystem (e.g., the surrounding vehicle trajectory prediction module 52 or the safe trajectory determination module 60). The output of the subsystem is based on the obtained sensor values, and the confidence level is generated based (at least in part) on the trustworthiness of the obtained sensor values. In one aspect, the confidence estimator may be part of the processor(s) 18. In other aspects, the confidence estimator may be part of the module(s) 46.

For example, the ego vehicle 100 may provide the sensor values to a trajectory predictor (e.g., the surrounding vehicle trajectory prediction module 52 or the safe trajectory determination module 60), which generates a predicted trajectory of the ego vehicle 100 (or another vehicle) based on the sensor values. The ego vehicle 100 may determine that the obtained sensor values are relatively untrustworthy, and thus the confidence estimator may generate a low confidence level for the predicted trajectory. Accordingly, even if the trajectory predictor predicts a high likelihood that the ego vehicle 100 will take a given trajectory, the ego vehicle 100 may decide not to pass this predicted trajectory to a different subsystem because of the low confidence in the high-likelihood trajectory.

Figure 3:
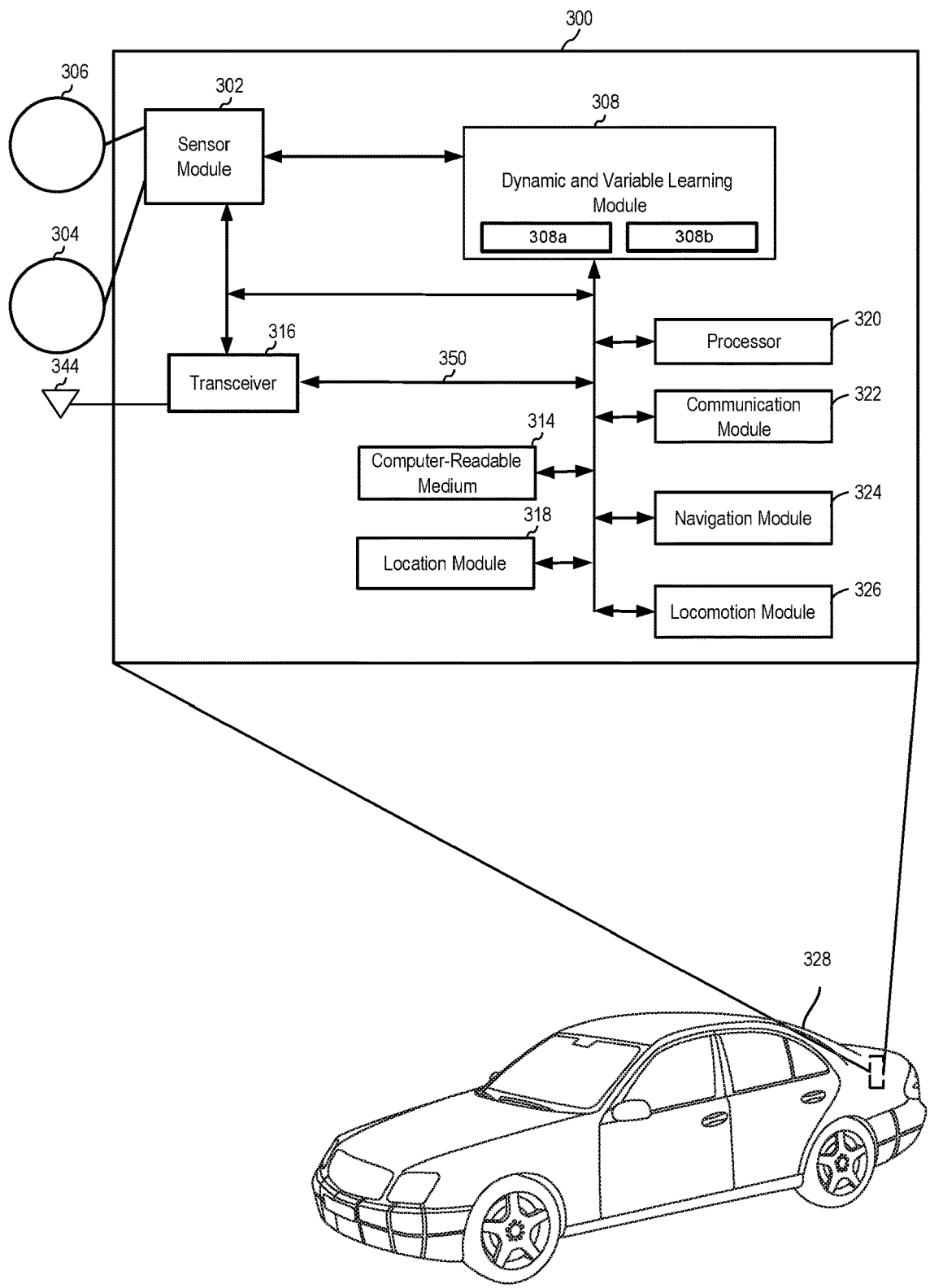
FIG. 3 is a diagram illustrating an example of a hardware implementation for a dynamic and variable learning system, according to aspects of the present disclosure.

FIG. 3 is a diagram illustrating an example of a hardware implementation for a dynamic and variable learning system 300, according to aspects of the present disclosure. The dynamic and variable learning system 300 may be a component of a vehicle, a robotic device, or another device. For example, as shown in FIG. 3, the dynamic and variable learning system 300 is a component of an autonomous vehicle 328. Although the dynamic and variable learning system 300 is located in the back of the autonomous vehicle 328, the dynamic and variable learning system 300 may be located anywhere in the vehicle (e.g., the front of the vehicle). Aspects of the present disclosure are not limited to the autonomous vehicle 328, as other devices, such as a bus, boat, drone, or robot, are also contemplated for using the dynamic and variable learning system 300. The autonomous vehicle 328 may be autonomous or semi-autonomous.

The dynamic and variable learning system 300 may be implemented with a bus architecture, represented generally by a bus 350. The bus 350 may include any number of interconnecting buses and bridges depending on the specific application of the dynamic and variable learning system 300 and the overall design constraints. The bus 350 links together various circuits including one or more processors and/or hardware modules, represented by a processor 320, a communication module 322, a location module 318, a sensor module 302, a locomotion module 326, a navigation module 324, a computer-readable medium 314, and a dynamic and variable learning module 308. The dynamic and variable learning module 308 includes a trust estimator 308a and a confidence estimator 308b. In some aspects, the dynamic and variable learning module 308, including the trust estimator 308a and the confidence estimator 308b, is part of the processor 320. The bus 350 may also link various other circuits such as timing sources, peripherals, voltage regulators, and power management circuits, which are well known in the art, and therefore, will not be described any further.

The dynamic and variable learning system 300 includes a transceiver 316 coupled to the processor 320, the sensor module 302, the dynamic and variable learning module 308, the communication module 322, the location module 318, the locomotion module 326, the navigation module 324, and the computer-readable medium 314. The transceiver 316 is coupled to an antenna 344. The transceiver 316 communicates with various other devices over a transmission medium. For example, the transceiver 316 may receive commands via transmissions from a user or a remote device. As another example, the transceiver 316 may transmit driving statistics and information, environmental information and other desirable information from the dynamic and variable learning module 308 to a server (not shown) or vice versa.

The dynamic and variable learning system 300 includes the processor 320 coupled to the computer-readable medium 314. The processor 320 performs processing, including the execution of software stored on the computer-readable medium 314 providing functionality according to the disclosure. The software, when executed by the processor 320, causes the dynamic and variable learning system 300 to perform the various functions described for a particular device, such as the autonomous vehicle 328, or any of the modules 302, 314, 316, 318, 320, 322, 324, 326. The computer-readable medium 314 may also be used for storing data that is manipulated by the processor 320 when executing the software.

The sensor module 302 may obtain measurements or environmental information via different sensors, such as a first sensor 306 and a second sensor 304. For example, the sensors may determine and provide the ambient condition information and sensor values to the dynamic and variable learning module 308. The first sensor 306 may be an ambient condition sensor. The second sensor 304 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 304, 306.

The measurements of the first sensor 306 and the second sensor 304 may be processed by one or more of the processor 320, the sensor module 302, the communication module 322, the location module 318, the dynamic and variable learning module 308, the locomotion module 326, and the navigation module 324, in conjunction with the computer-readable medium 314, to implement the functionality described herein. In one configuration, the data captured by the first sensor 306 and the second sensor 304 may be transmitted to an external device via the transceiver 316. The first sensor 306 and the second sensor 304 may be coupled to the autonomous vehicle 328 or may be in communication with the autonomous vehicle 328.

The location module 318 may determine a location of the autonomous vehicle 328. For example, the location module 318 may use a global positioning system (GPS) to determine the location of the autonomous vehicle 328. The communication module 322 may facilitate communications via the transceiver 316. For example, the communication module 322 may be configured to provide communication capabilities via different wireless protocols, such as WiFi, long term evolution (LTE), 4G, 5G, etc. The communication module 322 may also be used to communicate with other components of the autonomous vehicle 328 that are not modules of the dynamic and variable learning system 300.

The locomotion module 326 may facilitate locomotion of the autonomous vehicle 328. As an example, the locomotion module 326 may control the movement of the wheels. As another example, the locomotion module 326 may be in communication with a power source of the autonomous vehicle 328, such as an engine or batteries. Of course, aspects of the present disclosure are not limited to providing locomotion via wheels and are contemplated for other types of components for providing locomotion, such as propellers, treads, fins, and/or jet engines.

The dynamic and variable learning system 300 also includes the navigation module 324 for planning a route and controlling the locomotion of the autonomous vehicle 328, via the locomotion module 326. The navigation module 324 may be in communication with the dynamic and variable learning module 308, the sensor module 302, the transceiver 316, the processor 320, the communication module 322, the location module 318, the locomotion module 326, and the computer-readable medium 314.

The modules may be software modules running in the processor 320, resident/stored in the computer-readable medium 314, one or more hardware modules coupled to the processor 320, or some combination thereof.

According to aspects of the present disclosure, the dynamic and variable learning system 300 includes a dynamic and variable learning module 308 in communication with the navigation module 324, the sensor module 302, the transceiver 316, the processor 320, the communication module 322, the location module 318, the locomotion module 326, and the computer-readable medium 314.

In one configuration, the dynamic and variable learning module 308 determines, based on ambient conditions determined by the ego vehicle 100, trustworthiness parameters of sensor values obtained from one or more sensors (e.g., the sensors 304, 306) of the autonomous vehicle 328. For example, as shown in FIG. 2, the sensor system 22 provides the ambient condition values and the other sensor values used to determine the confidence of a subsystem that is based on the trustworthiness of the sensor values. For example, the confidence in an accuracy of an output of the subsystem is determined based on the trustworthiness of the sensor values.

For example, the trustworthiness may be determined by a trust estimator 308a trained based on previously-collected driving data. For example, the driving data may indicate a predicted trajectory for a vehicle and an actual trajectory taken by the vehicle. The trajectory may have been predicted based on sensor values from the same (or similar) one or more sensors as the autonomous vehicle 328, obtained under the same (or similar) ambient conditions. The trust estimator 308a may be trained based on computed differences of the predicted trajectories and the actual trajectories. Based on this training, the trust estimator 308a can determine a trustworthiness of sensor values obtained from the one or more sensors under the current conditions.

In one aspect, a confidence estimator 308b generates a confidence level for an output of a subsystem of the autonomous vehicle 328. The confidence level indicates a confidence in the accuracy of the output of the subsystem. The output of the subsystem is based on the obtained sensor values, and the confidence level is generated based (at least in part) on the trustworthiness of the obtained sensor values.

Figure 4:
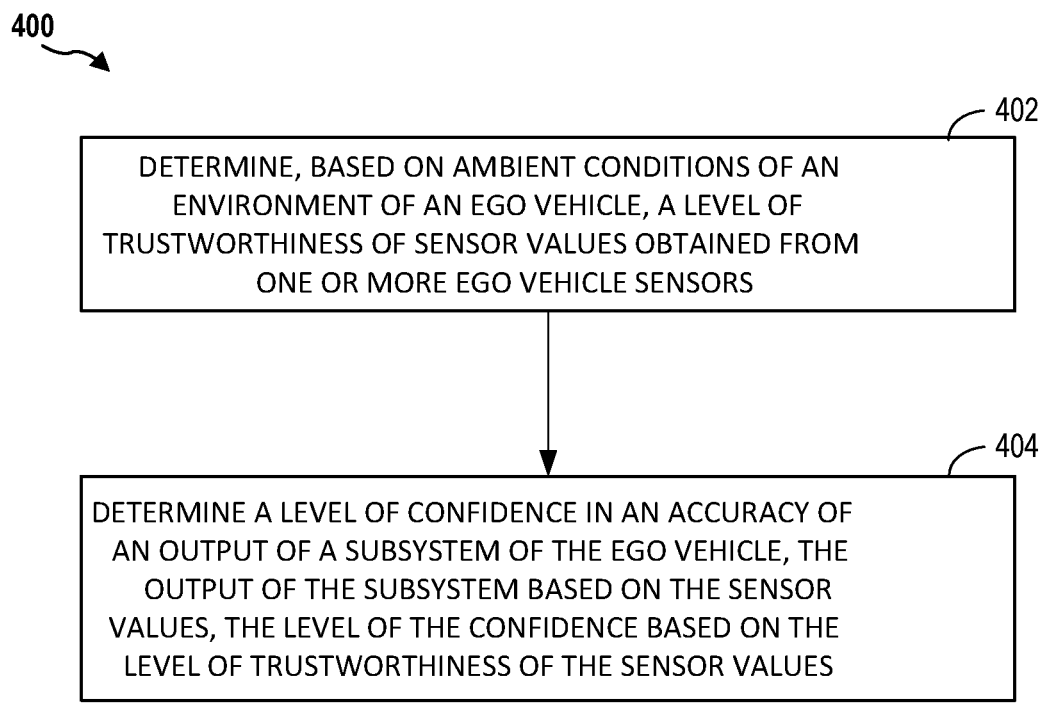
FIG. 4 illustrates a method for providing dynamic and variable learning of an ego vehicle by determining and using most-trustworthy inputs according to an aspect of the present disclosure.

FIG. 4 illustrates a method 400 for providing dynamic and variable learning of an ego vehicle by determining and using most-trustworthy inputs according to an aspect of the present disclosure. As shown in FIG. 4, at block 402, an ego vehicle determines, based on ambient conditions of an environment of the ego vehicle, a level of trustworthiness of sensor values obtained from one or more ego vehicle sensors. At block 404, the ego vehicle determines a level of confidence in an accuracy of an output of a subsystem of the ego vehicle. The output of the subsystem is based on the sensor values, and the level of confidence is based on the level of trustworthiness of the sensor values.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of providing dynamic and variable learning for an ego vehicle by determining and using most-trustworthy inputs, comprising:
   determining, based on ambient conditions of an environment of the ego vehicle, a level of trustworthiness of sensor values obtained from one or more ego vehicle sensors;
   determining a level of confidence in an accuracy of an output of a subsystem of the ego vehicle, the output of the subsystem based on the sensor values, the level of confidence based on the level of trustworthiness of the sensor values;
   controlling the ego vehicle to follow a trajectory having a level of confidence greater than a threshold confidence level and the level of trustworthiness of the sensor values greater than a threshold trustworthiness level, in which the level of trustworthiness is determined by a trust estimator trained based on previously-collected driving data, and in which the level of confidence is determined based on a confidence estimator; and controlling the ego vehicle to follow a fail-safe trajectory if the level of confidence of the trajectory is greater than a threshold non-confidence level and the level of trustworthiness of the sensor values is greater than a threshold non-trustworthiness level.

2. The method of claim 1, further comprising:
updating the level of trustworthiness of the sensor values when the ambient conditions change; and
updating the level of confidence in the accuracy of the output of the subsystem of the ego vehicle based on the updated sensor values.

3. The method of claim 1, in which the ambient conditions are determined by ambient condition sensors of the ego vehicle and/or are provided to the ego vehicle from a remote device.

4. The method of claim 1, further comprising reducing the level of trustworthiness of the sensor values from a RADAR sensor when the ego vehicle is in a crowded area.

5. The method of claim 1, further comprising increasing the level of trustworthiness of the sensor values of a RADAR sensor when the ego vehicle is traveling on a highway.

6. The method of claim 1, further comprising reducing the level of trustworthiness of the sensor values from a camera of the ego vehicle when the ego vehicle is subject to low-light conditions that result in black images or high-light conditions that result in washed-out white images.

7. A system of providing dynamic and variable learning for an ego vehicle by determining and using most-trustworthy inputs, comprising:
a memory; and
at least one processor, the at least one processor configured:
to determine, based on ambient conditions of an environment of the ego vehicle, a level of trustworthiness of sensor values obtained from one or more ego vehicle sensors;
to determine a level of confidence in an accuracy of an output of a subsystem of the ego vehicle, the output of the subsystem based on the sensor values, the level of confidence based on the level of trustworthiness of the sensor values;
to control the ego vehicle to follow a trajectory having a level of confidence greater than a threshold confidence level and the level of trustworthiness of the sensor values greater than a threshold trustworthiness level, in which the level of trustworthiness is determined by a trust estimator trained based on previously-collected driving data, and in which the level of confidence is determined based on a confidence estimator; and
to control the ego vehicle to follow a fail-sage trajectory is the level of confidence of the trajectory is greater than a threshold non-confidence level and the level of trustworthiness of the sensor values is greater than a threshold non-trustworthiness level.

8. The system of claim 7, in which the at least one processor is further configured:
to update the level of trustworthiness of the sensor values when the ambient conditions change; and
to update the level of confidence in the accuracy of the output of the subsystem of the ego vehicle based on the updated sensor values.

9. The system of claim 7, in which the ambient conditions are determined by ambient condition sensors of the ego vehicle and/or are provided to the ego vehicle from a remote device.

10. The system of claim 7, in which the at least one processor is further configured to reduce the level of trustworthiness of the sensor values from a RADAR sensor when the ego vehicle is in a crowded area.

11. The system of claim 7, in which the at least one processor is further configured to increase the level of trustworthiness of the sensor values of a RADAR sensor when the ego vehicle is traveling on a highway.

12. The system of claim 9, in which the at least one processor is further configured to reduce the level of trustworthiness of the sensor values from a camera of the ego vehicle when the ego vehicle is subject to low-light conditions that result in black images or high-light conditions that result in washed-out white images.

13. A non-transitory computer-readable medium having program code recorded thereon to provide dynamic and variable learning for an ego vehicle by determining and using most-trustworthy inputs, the program code being executed by a processor and comprising:
program code to determine, based on ambient conditions of an environment of the ego vehicle, a level of trustworthiness of sensor values obtained from one or more ego vehicle sensors;
program code to determine a level of confidence in an accuracy of an output of a subsystem of the ego vehicle, the output of the subsystem based on the sensor values, the level of confidence based on the level of trustworthiness of the sensor values;
program code to control the ego vehicle to follow a trajectory having a level of confidence greater than a threshold confidence level and the level of trustworthiness of the sensor values greater than a threshold trustworthiness level, in which the level of trustworthiness is determined by a trust estimator trained based on previously-collected driving data, and in which the level of confidence is determined based on a confidence estimator; and
program code to control the ego vehicle to follow a fail-safe trajectory is the level of confidence of the trajectory is greater than a threshold non-confidence level and the level of trustworthiness of the sensor values is greater than a threshold non-trustworthiness level.

14. The non-transitory computer-readable medium of claim 13, further comprising program code to:
update the level of trustworthiness of the sensor values when the ambient conditions change; and
update the level of confidence in the accuracy of the output of the subsystem of the ego vehicle based on the updated sensor values.

15. The non-transitory computer-readable medium of claim 13, in which the ambient conditions are determined by ambient condition sensors of the ego vehicle and/or are provided to the ego vehicle from a remote device.

16. The non-transitory computer-readable medium of claim 13, further comprising program code to reduce the level of trustworthiness of the sensor values from a RADAR sensor when the ego vehicle is in a crowded area.

* * * * *